W. E. WARD.
COMBINED TOILET MIRROR AND LAMP.
APPLICATION FILED OCT. 25, 1913.

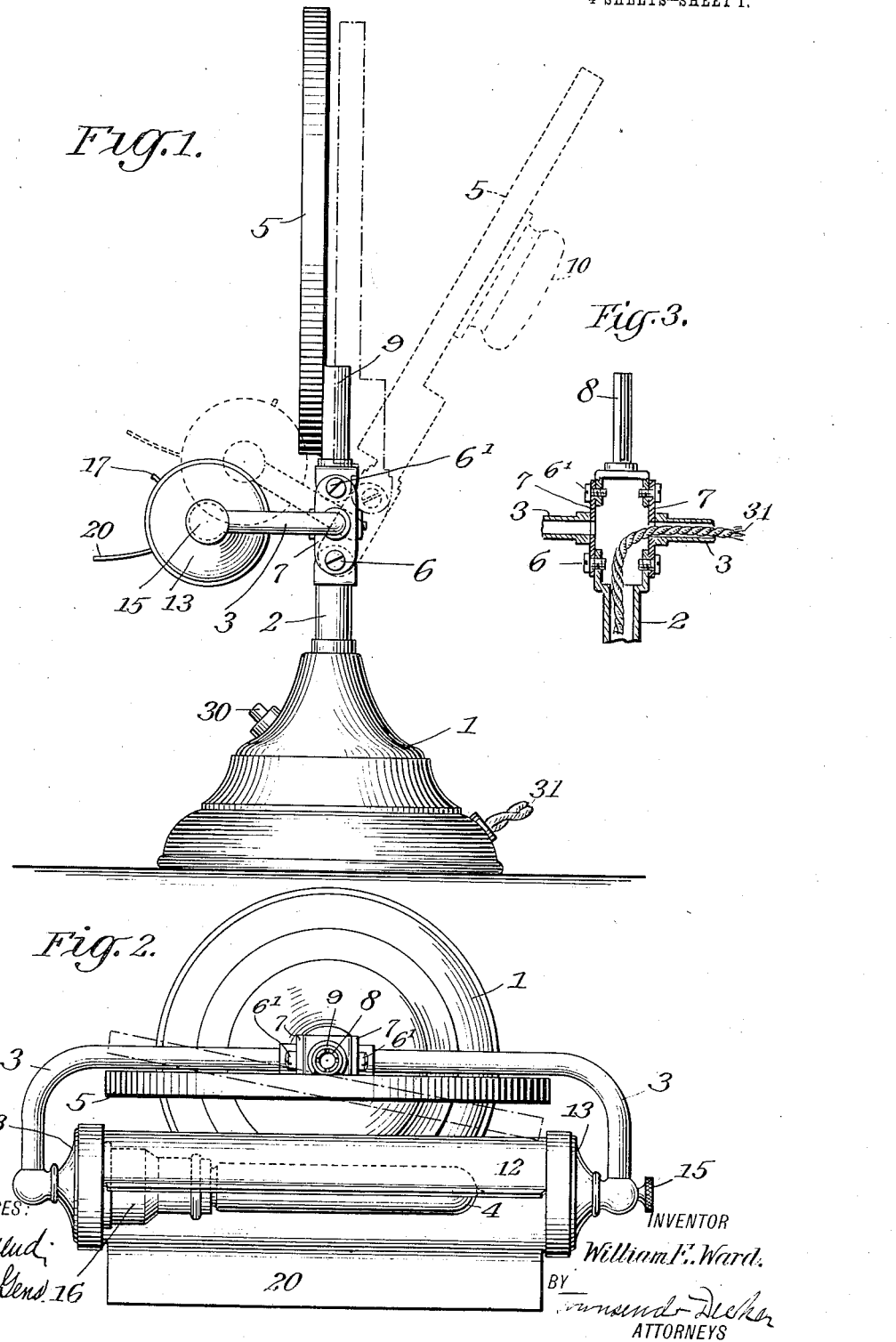

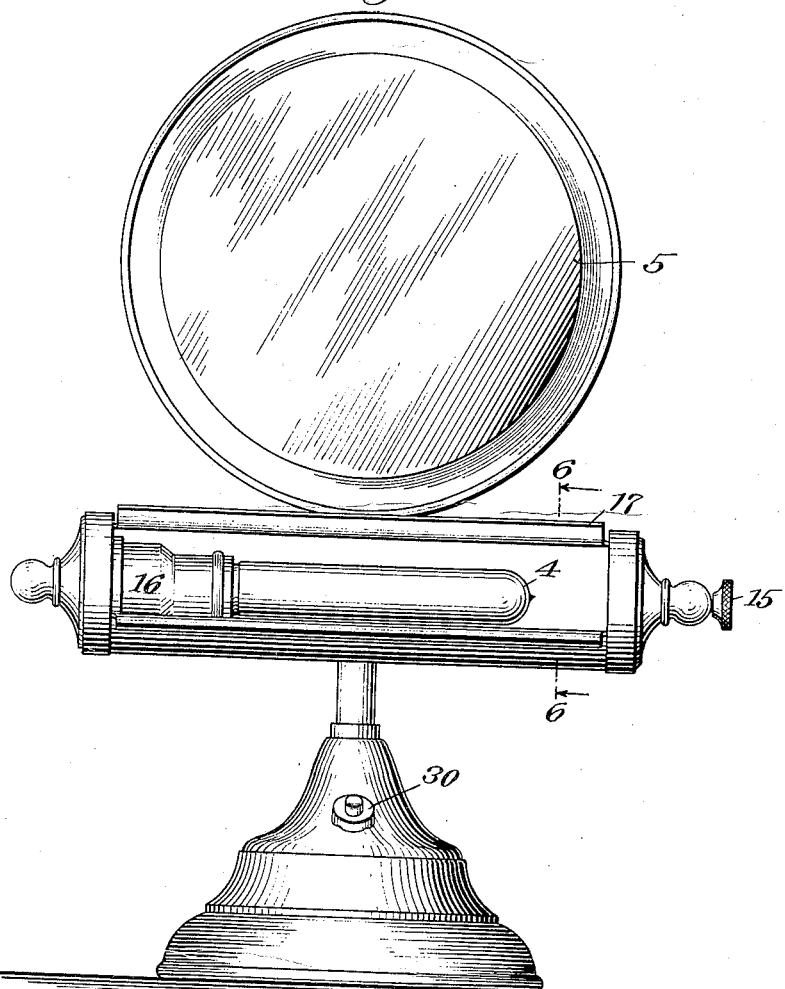
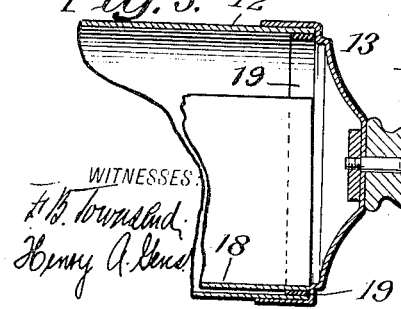
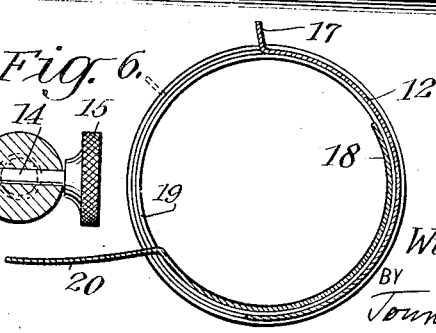

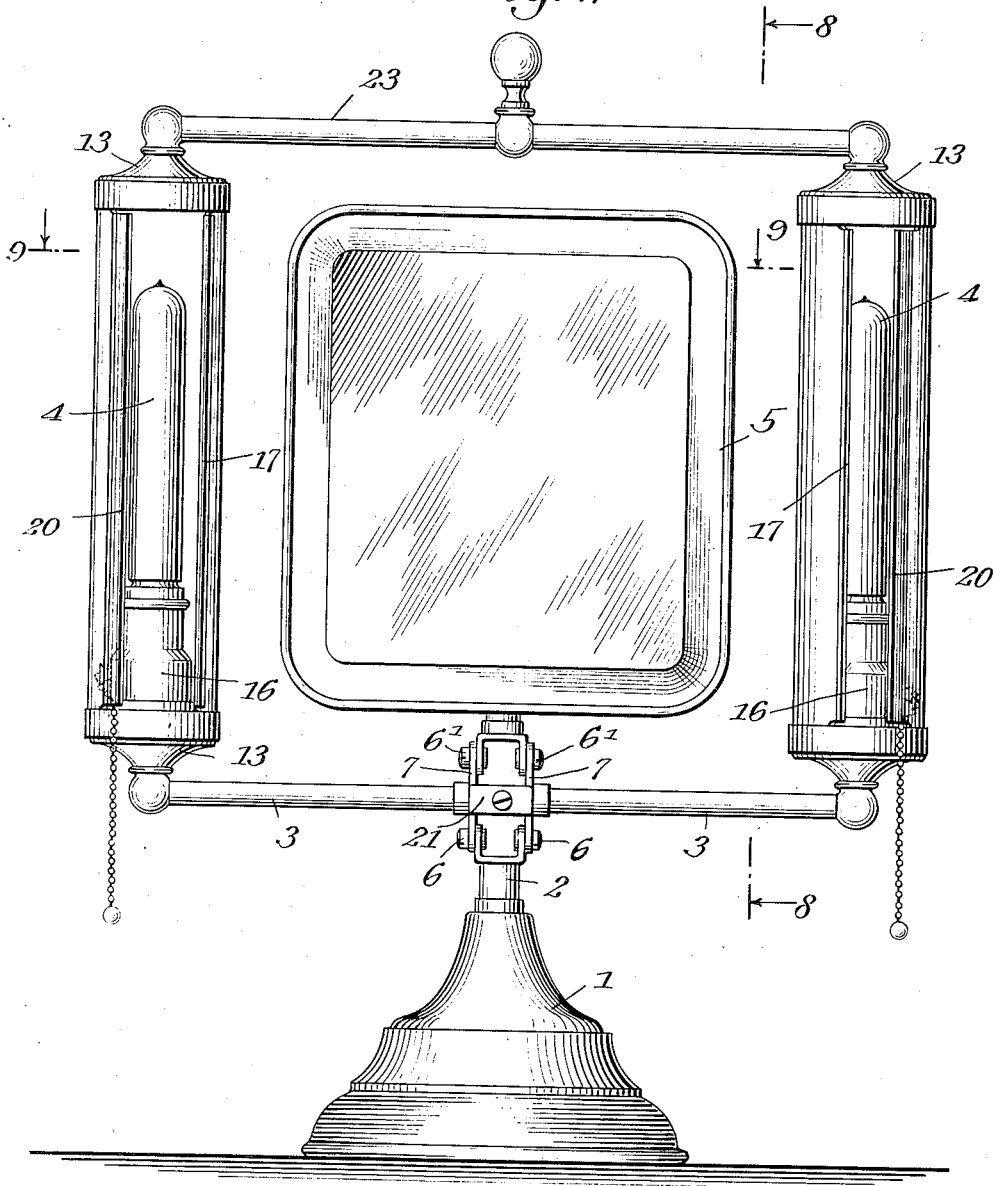

1,120,773.

Patented Dec. 15, 1914.
4 SHEETS—SHEET 4.

WITNESSES:
H. B. Townsend
Henry A. Gens

INVENTOR
William E. Ward.
BY
Townsend & Decker
ATTORNEYS

UNITED STATES PATENT OFFICE.

WILLIAM E. WARD, OF BAYONNE, NEW JERSEY.

COMBINED TOILET MIRROR AND LAMP.

1,120,773.   Specification of Letters Patent.   Patented Dec. 15, 1914.

Application filed October 25, 1913. Serial No. 797,198.

*To all whom it may concern:*

Be it known that I, WILLIAM E. WARD, a subject of the King of Great Britain, and a resident of Bayonne, in the county of Hudson and State of New Jersey, have invented new and useful Improvements in Combined Toilet Mirrors and Lamps, of which the following is a specification.

My invention relates to a combined toilet mirror and lamp wherein the light is provided by electric lamp of any suitable construction employed for illuminating the face or person of the user of the mirror.

The object of my invention is to provide a construction of toilet mirror and electric lamp in which the lamp and mirror are combined for use and supported upon a common base or stand and wherein also the lamp and mirror may be readily adjusted into any position to suit the desire of the user, while at the same time securing other advantages in compactness, appearance of the apparatus and cheapness, as will be clear to those skilled in the art from the subjoined description and accompanying drawings.

My invention consists in the construction and combination of apparatus hereinafter described and then pointed out in the claims.

Figure 8:
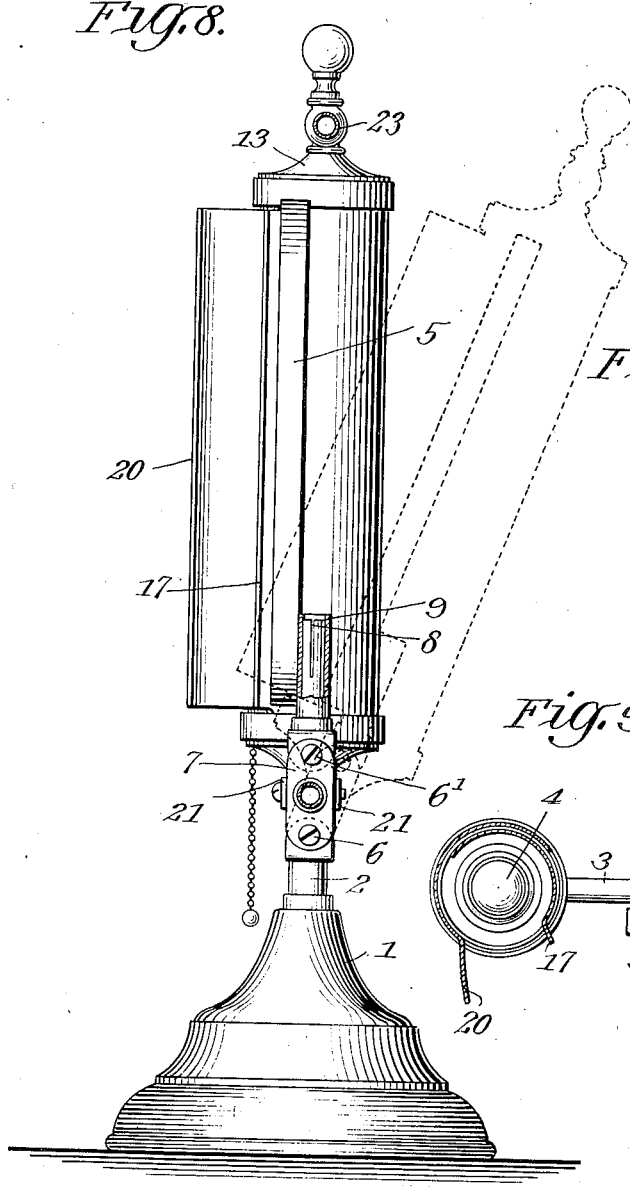
Figure 10:
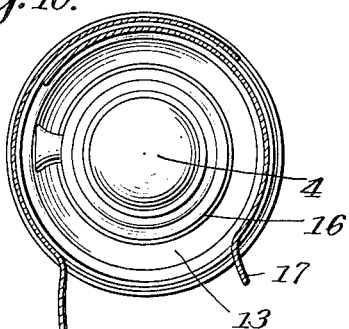
Figure 11:
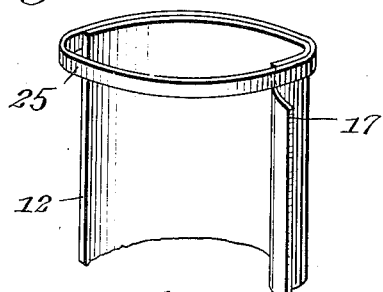
Figure 9:
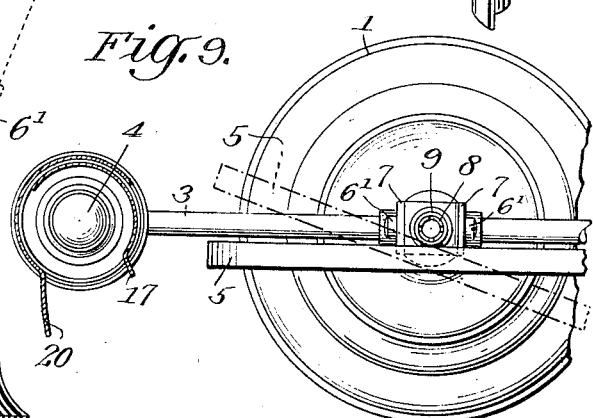

In the drawings Figure 1 is a side elevation of one form of an apparatus embodying my invention and particularly suited for use as a shaving mirror and lamp. Fig. 2 is a general plan of the same, the mirror being removed. Fig. 3 is a detail of construction of the means employed for supporting the mirror and lamp to permit a ready adjustment of the parts together or independently of one another, as will be more fully described. Fig. 4 is a front elevation of the apparatus. Fig. 5 is a partial section of the shield and reflector and shows the manner of mounting the same. Fig. 6 is a vertical cross-section through the shield and reflector. Fig. 7 is a front elevation of a combined toilet mirror and lamp specially designed for use on a lady's dressing table. Fig. 8 is a side elevation of the same. Fig. 9 is a plan of the base or stand and mirror and one of the arms carrying one of the lamps, the screen and reflector being shown in horizontal section. Fig. 10 is a cross-section through the screen and reflector. Fig. 11 shows one end of the reflector for one of the lamps in perspective detached from the screen or shield.

Referring to Figs. 1 to 6 of the drawings: 1 is a base or stand adapted to set upon a table or other horizontal support or to be attached to a wall or other vertical surface. The base is preferably hollow to form a housing for the electric conductors leading to the lamp through the tip or extremity 2 and one or more of the hollow or tubular arms or extensions 3, which sustain the lamp socket and lamp directly and are themselves supported from the base or the tip thereof in any desired way but preferably in the manner to be presently described. 4 is the electric lamp and 5 is the mirror both of which are supported from the base or its tip or extremity, and 12 is a shield or screen which is properly mounted so as to serve to cut off the rays of the lamp from directly impinging upon the mirror while permitting them to illuminate the face of the user which is thus seen in the mirror by the reflected light of the lamp. The mounting of the lamp carrying arm and mirror on the base consists preferably of a duplex joint preferably of the friction type, the two members of which duplex joint are indicated at 6 and 6'. The lower member 6 is mounted directly on the base as shown and sustains the upper member 6' which in turn supports the mirror. The intermediate or connecting pieces 7 between the two members carrying the tubular arm or arms 3 are one or both perforated in line with the bore of the arms so that the conductors passing through the tip 2 may be extended through the duplex joint and hollow arm to the lamp, thus allowing freedom of movement and adjustment of the parts without interference from the conductors, while the latter are at the same time practically concealed. The upper member of the duplex joint is provided with a pin or post 8, as shown, upon which the mirror may be swiveled by means of the socket 9 attached to the mirror. This permits the mirror to be readily detached from its stand and allows it to be used independently of the lamp as a hand mirror, the latter use of the mirror being facilitated by the knob or handle 10 on the back thereof as shown.

As will be seen, the mirror and lamp together with the shield being all supported together from the lower member of the joint may be tilted backward and forward together by turning on said lower member or the mirror may be tilted independently on the upper member of the joint or may be turned sidewise on its swivel post as may be desired by the user. The mirror is shown (in dotted lines in Fig. 1) tilted by tilting the parts upon the lower member of the joint and also (in dotted lines) in the upright position which it may assume after such tilting by tilting it back to upright position on the upper member of the joint.

The screen 12 is conveniently made of a semi-cylinder or partial cylinder of sheet metal fastened in the heads 13. One of said heads may be secured to and supported by a pin 14 having a thumb piece 15 and mounted in the end of one of the arms 3. The other head is capable of turning on the tubular base of the lamp socket 16. By turning the shield the presentation of the opening in its side may be changed to permit the lamp to more or less fully illuminate the user, the lamp being in the meantime fully obscured so far as the mirror itself is concerned, so that the rays cannot pass directly to the mirror and by reflection back into the eyes of the user interfere with free vision so far as his own reflected image is concerned. If desired, one edge of the screen may have a projecting lip as at 17 which will aid in cutting off the direct rays of the lamp from the eyes of the user. In addition the lamp may be provided with an adjustable reflector by means of which the user may be rendered visible by indirect illumination and whereby through absence of glare either on the person of the user or in his eyes directly the use of the mirror and lamp may be further improved. Such a reflector is indicated at 18. Said reflector consists preferably of a metal sector of sheet metal having dull reflecting surface, mounted in the shield or screen 12 by means of the interior rings 19 which are capable of turning in the heads 13 and have the sector 18 fastened to them. The reflector has preferably a skirt or flange 20 projecting as shown to aid in illuminating the face of the user of the apparatus when the shield is turned into position to fully obscure the direct light from his eyes.

Any other construction of shield and reflector adapted to act when mounted in proper relation to the lamp and mirror in the manner described might be used. The form shown is merely selected as one out of many suitable for the purpose of my invention and no claim of novelty is herein laid to the same *per se*.

In the modification of my invention shown in Fig. 7 and following figures, a pair of lamps is shown and each is mounted at the side of the mirror instead of beneath the same as in the form shown in Figs. 1 and 4. In this instance each of the hollow arms 3 terminates in a suitable lamp socket and lamp and the form of lamp is preferably the same as that shown in Figs. 1 and 4, to wit: an incandescent lamp having an elongated filament and elongated bulb. In this case also the conductors for each lamp pass through a hollow arm or support 3 which is mounted on a connecting piece between two members of the duplex joint. To stiffen the construction, the connecting pieces 7 may be clamped between plate 21 bearing against their edges. The element which has heretofore been described as the reflector by reason of its having the extended skirt or reflecting surface 20 forms in this instance an extension from one side of a shell or partial sheet metal cylinder, which is fixed at its ends in heads 13. The heads at the lower ends of said shells turn, as before, upon the stems or the sockets or bases of the lamps, while the upper heads turn upon the ends of the ornamental cross-brace or piece 23. The part or element which has been before described as the shield and which operates to cut off the direct rays of the lamp from the mirror, while the reflector is acting to light the object by indirect lighting, is in this instance carried by rings 25 which turn within the ends of the shell, which carries the reflecting skirt 20, and the lip 17 of such shield, as in the previous instance, aids in cutting off the direct rays of light from the eye of the user during the indirect illumination afforded by the reflection of light from the dull reflecting surfaces of part 20 and the interior parts of the shell that act in conjunction therewith as reflectors of the light. This relation and operation of the parts is better shown in Fig. 9, in which also the swiveling of the mirror is shown by the dotted lines, when the swiveling action of the mounting for the mirror is utilized in order to enable the user to get a better view in the mirror.

30 indicates the button for any suitable push-button switch contained within the base, while 31 indicates an inlet in the base or support 1 for the conductors which supply energy to the lamp, said conductors being carried up through the tip or extremity of said base or support, as already explained. Obviously said switch may be employed or not, as desired, at this point, and likewise it is obvious that the conductors might be led into the hollow base or support through the bottom instead of through the side.

As will be seen, my invention provides a simple and efficient construction and combination of lamp and mirror in which provision is made for adjustment of the lamp and mirror to suit all possible requirements or conditions of combined use and in which, further, the electric conductors connected to the lamp are concealed.

What I claim as my invention is:—

1. In a combined mirror and lamp, a mounting comprising a duplex joint one member of which carries the mirror while the other member is connected to a suitable base and a connecting piece between the members of the joint having a tubular arm extending therefrom to form a support for the lamp.

2. In a combined mirror and lamp, the combination of a base, a duplex joint mounted thereon, a mirror supported from one member of the joint, a connecting piece between the members of said joint and a tubular arm extending from the connecting piece and carrying means for supporting the lamp.

3. In a combined mirror and electric lamp, the combination of a base, a duplex joint one member of which is connected directly thereto, a mirror supporting pin carried by the other member of said duplex joint and a tubular supporting arm for the lamp terminating in the connecting piece between the two members of the joint.

4. A combined mirror and electric lamp having a mounting comprising a duplex joint, one member of which is jointed directly to a stand or support while the other is supported by the first-named member and is provided with a swiveling pin or post directly attached thereto and forming a support for the mirror and upon which the mirror is adapted to be turned in a plane transverse to the plane in which the member carrying said pin turns, and an arm extended transversely from the joint and carrying means for supporting the lamp.

5. A combined mirror and electric lamp comprising a stand or base carrying a duplex joint constituting a mounting for the lamp and mirror, one member of said joint being jointed directly to the base and forming means for tilting the lamp and mirror together, while the other forms a support for permitting the mirror to be tilted independently of the lamp.

6. A combined mirror and electric lamp having a mounting consisting of a duplex joint and a connecting member for the members of the joint, one member of said joint being provided with means for supporting the mirror and the other member being jointed to the base and affording a support for the first, while the intermediate member carries a support for the lamp.

Signed at New York in the county of New York and State of New York this 24th day of October A. D. 1913.

WILLIAM E. WARD.

Witnesses:
F. B. TOWNSEND,
HENRY A. GENS.